Figure 1:
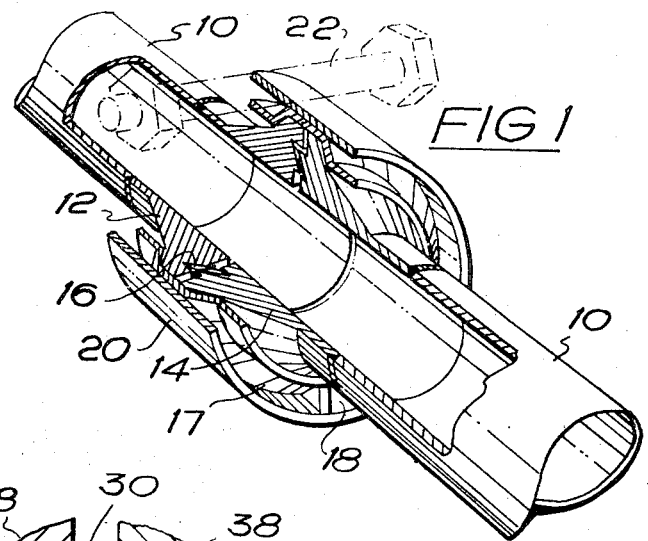

United States Patent

[11] 3,630,553

| [72] | Inventor | George M. Foulger |
| | | Keighley, England |
| [21] | Appl. No. | 11,753 |
| [22] | Filed | Feb. 16, 1970 |
| [45] | Patented | Dec. 28, 1971 |
| [73] | Assignee | Smith & Johnson (Sales) Limited |
| | | Keighley, Yorkshire, England |

[54] COUPLED JOINTS
4 Claims, 3 Drawing Figs.

[52] U.S. Cl. .................................................. 285/340,
285/367, 285/DIG. 18, 277/172, 277/236
[51] Int. Cl. ........................................................ F16l 23/00
[50] Field of Search ............................................. 285/340,
DIG. 18, 336, 367; 277/236, 171, 172

[56] References Cited
UNITED STATES PATENTS
1,965,273   7/1934   Wilson ........................ 285/340 X
2,992,840   7/1961   Reynolds et al. .............. 285/340 X FOREIGN PATENTS
885,304    12/1961   Great Britain ................ 277/236
928,699     6/1963   Great Britain ................ 285/340
6,805,184  10/1968   Netherlands .................. 285/DIG. 18

Primary Examiner—Thomas F. Callaghan
Attorney—Abraham A. Saffitz

ABSTRACT: A joint connecting end-to-end pipe sections wherein there are two opposed flanges respectively having frustoconical faces whereby a frustoconical annular chamber is defined in which is located a rhomboidal sectioned gasket of which the parallel sides are both frustoconical and the cone angles of the gasket parallel sides and the flanges are inclined in the same direction with the flange face angle being largest so that the gasket when the joint is made takes up an "S"-shaped configuration with the crests of the "S" bearing respectively upon said opposed frustoconical faces of the flanges.

PATENTED DEC 28 1971 3,630,553

INVENTOR:
GEORGE MORRIS FOULGER

By *a. a. Suffity*
ATTORNEY

COUPLED JOINTS

This invention relates to couplings or joints for connecting end to end fluid-carrying pipes or conduits or the like and having matched flanges and a gasket positioned between the flanges for sealing the coupling or joint. The said flanges define a pair of opposed annular frustoconical faces spaced from each other, one of said flanges having an annular projection extending outwardly from the inner circumference of its frustoconical face to define an annular shoulder facing outwardly from the axis of the flanges, the other of said flanges having an annular projection extending outwardly from the outer circumference of its frustoconical face to define an annular shoulder facing inwardly towards said axis. When the joint is completed a gasket is arranged in the space between the opposed frustoconical faces, said gasket having inner and outer frustoconical side surfaces which are for contact with respective frustoconical faces of the flanges to seat the joint. Such joints will be referred to hereinafter and in the appended claims as "joints of the type aforesaid."

In already known joints of the type aforesaid, the gasket is designed to the opposed frustoconical faces of the flanges such that when the joint is made by drawing the flanges together, the gasket completely fills the space between the opposed frustoconical faces. This joint has the disadvantage that if a bending moment is applied thereto and some deflection results, there is a tendency for the joint to leak.

An object of this invention is to provide a new and improved joint of the type aforesaid.

The invention provides a joint of the type aforesaid wherein the gasket is so shaped that when the joint is made the gasket deforms so that its cross section becomes substantially "S" shaped, with the crests if the "S" shape contacting the opposite frustoconical faces of the flanges.

Preferably, the gasket is of a rhomboidal shape in cross section, the opposite sides of such rhomboidal shape being inclined in the same direction relative to the gasket axis so that the gasket can engage the roots of the corners between the frustoconical faces and the annular shoulders.

Preferably also, the opposed frustoconical faces are parallel, and the annular shoulders are cylindrical.

By virtue of the fact that the cross section of the gasket takes up an "S" configuration, the sealing of the joint is improved and this arrangement allows a slight yield of the joint, such as when a bending moment is applied thereto, without the sealing of the joint breaking down. The yield is achieved because the gasket does not completely fill the space between the frustoconical faces and can yield into the remaining air spaces when bending takes place.

The joint preferably includes a clamp for pulling the flanges together to deform the gasket and complete the joint.

Figure 2:
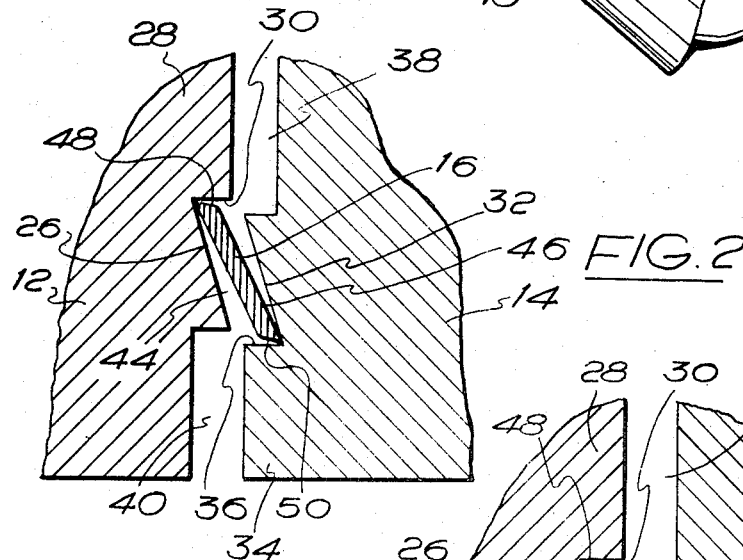
Figure 3:
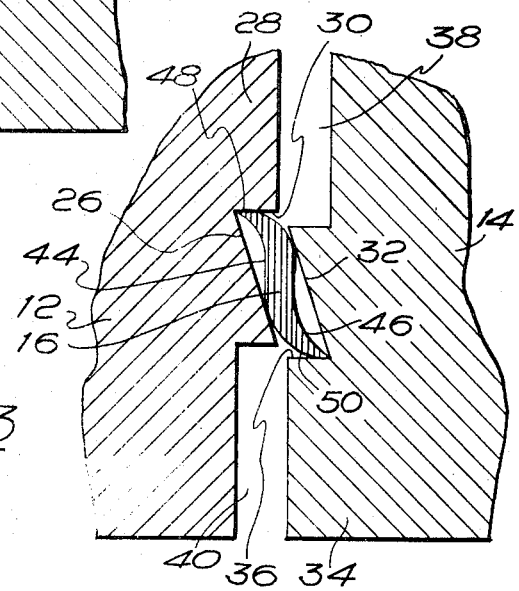

The invention is also a joint of the type aforesaid in the constructed state with the flanges drawn together by the clamp and the gasket deformed between and contacting the opposed frustoconical faces. An embodiment of the invention will now be described, by way of example, with reference to the accompanying drawings, wherein:

FIG. 1 is a perspective view, broken away to show internal details, of a joint of the type aforesaid and according to the present invention; and FIGS. 2 and 3, show in sectional elevation, parts of the joint flanges and the gasket there between, before and after the joint is clamped respectively. Referring firstly to FIG. 1, the joint is to couple together end to end two fluid-carrying pipes or conduits 10 and comprises a pair of matching flanges 12, 14 welded or otherwise secured to the opposed ends of pipes 10. Between the flanges 12, 14 is a sealing gasket 16 which seals the joint, and holding the joint together is a clamp comprising a pair of hemispherical clamp rings 17, 18 which fit over the adjacent outer peripheral edges of the flanges 12, 14 and are tightened by a clamping band 20 the effective length of which is adjusted, to adjust the clamping together of the flanges 12, 14, by a clamping bolt 22, shown diagrammatically and in dotted lines in FIG. 1. The clamping together of the flanges 12, 14 causes deformation of the sealing gasket 16 positioned between the opposed ends of the flanges 12, 14 so sealing the joint.

The contours of the ends of the flanges 12, 14 are shown clearly in FIGS. 2 and 3 and it will be seen that the ends are complementary, i.e. male and female. The end of flange 12 has a frustoconical face 26 at the outer diameter of which there is an annular projection 28 which defines a cylindrical shoulder 30 projecting inwardly, and the end face of flange 14 has a frustoconical face 32 of the same cone angle as face 26, from the inner end of which projects an annular projection 34 defining an outwardly facing cylindrical shoulder 36. The flanges are rabbeted as at 38 and 40 to accommodate the projections 28 and 34 when the flanges are brought together to seal the joint.

Between the opposed parallel faces 26 and 32 is positioned the gasket 16 which is before deformation, of a dished frustoconical shape having inner and outer frustoconical side faces 44, 46, the cone angle of the gasket 16, as shown in FIG. 2, being greater than that of each of the faces 26 and 32. The outer and inner end faces 48, 50 of the gasket 42 are also frustoconical in nature so that the section of the gasket has the rhomboidal shape shown in FIG. 2, the inclination of the end faces 48, 50 being in the same relative direction as that of the side faces 44, 46. This feature enables the gasket to be positioned as shown in FIG. 2 with the edge between the outer end face 48 and inner side face 44 located at the root of the corner between face 26 and shoulder 30 and the diagonally opposite edge in the root of the corner between face 32 and shoulder 36.

This provides the considerable advantage, that the gasket 16 during clamping does not impart any frictional forces on the faces 26 and 32 of the flange, which forces do in fact exist in known joints of the type aforesaid wherein the gasket is not designed to locate, before clamping, in the root corners, but deforms into such corners during clamping. This results, in the known joint, in the parallel faces of the flanges becoming worn and eventually the joint leaks because of this. With the joint of the invention, there is no such wear however regardless of the number of times the gasket 16 is replaced.

The gasket 16 is of a material such as aluminum, copper and alloys thereof, or synthetic plastics material which is softer than that of the flanges, which may for example be of steel.

By the construction of gasket 16 and flanges as above described, when the clamp is adjusted to bring the flanges 12, 14 together, the gasket 16 deforms into a shape giving the section of the gasket 16 a substantial "S" shape and the crests of the "S" shape seal against the faces 26 and 32 as shown clearly in FIG. 3. The sealing pressure of the gasket 16 against the faces 26, 32 depends upon the amount of tightening of the clamp.

A joint as above described gives the advantage that, because the space between the faces 26 and 32 is not completely filled, the sealed joint can undergo some deflection as may be caused by bending moments applied thereto, without leaking.

The joint as above described has moreover proved to be extremely effective as a sealed joint for carrying fluids at different pressures and of differing consistencies.

The is not restricted to the specific example described, as modifications may be made without departing from the scope of the invention. Thus, it is not necessary that the faces 26, 32 should be parallel or the shoulders 30, 36 should be cylindrical. Moreover, other forms of clamps may be used.

I claim:

1. A joint for connecting end to end fluid-carrying pipes or conduits having matched flanges and a deformable gasket positioned between the flanges for sealing, said flanges defining a pair of opposed annular frustoconical faces spaced from each other, said faces having the same indentation in a first cone angle, one of said flanges having an annular projection extending outwardly from the inner circumference of its frustoconical face to define an annular shoulder facing outwardly from the axis of the flanges, the other of said flanges having an annular projection extending outwardly from the outer circumference of its frustoconical face to define an annular shoulder facing inwardly towards said axis; said gasket being of rhomboidal cross section and having inner and outer parallel frustoconical side surfaces which incline at a second cone angle and are for contact with respective frustoconical faces of the flanges to seal the joint; and inner and outer parallel frustoconical end faces of a third cone angle, said first, second and third cone angles being in the same direction relative to the joint axis and said first cone angle being the largest, and the flange and gasket dimensions being such that when the joint is made, the distance between the inwardly facing and outwardly facing annular shoulders is less than the larger diagonal of the gasket cross section whereby when the joint is made the gasket deforms so that its cross section becomes substantially "S" shaped, with the crests of the "S" shape contacting the opposite frustoconical faces of the flanges.

2. A joint according to claim 1, wherein the gasket engages the roots of the corners between the frustoconical faces and the annular shoulders.

3. A joint according to claim 1, wherein the gasket is constructed from a material of less hardness than said flanges.

4. A joint for connecting end to end fluid-carrying pipes or conduits having matched flanges and a deformable gasket positioned between the flanges for sealing, said flanges defining a pair of opposed annular frustoconical faces spaced from each other, said faces having the same indentation in a first cone angle, one of said flanges having an annular projection extending outwardly from the inner circumference of its frustoconical face to define an annular shoulder facing outwardly from the axis of the flanges, the other of said flanges having an annular projection extending outwardly from the outer circumference of its frustoconical face to define an annular shoulder facing inwardly towards said axis; and said gasket being of rhomboidal cross section and having inner and outer parallel frustoconical side surfaces which incline at a second cone angle and are for contact with respective frustoconical faces of the flanges to seal the joint; inner and outer parallel frustoconical end faces of a third cone angle, the said first, second and third cone angles being in the same direction relative to the joint axis and said first cone angle being the largest, and the flange and gasket dimensions being such that when the joint is made, the distance between the inwardly facing and outwardly facing annular shoulders is less than the larger diagonal of the gasket cross section whereby when the joint is made the gasket deforms so that its cross section becomes substantially "S" shaped, with the crests of the "S" shape contacting the opposite frustoconical faces of the flanges, and including a clamp for drawing the flanges together to deform the gasket as aforesaid and seal the joint.

* * * * *